United States Patent
Sawai (10) Patent No.: US 8,233,910 B2
(45) Date of Patent: Jul. 31, 2012

(54) WIRELESS COMMUNICATION DEVICE, WIRELESS COMMUNICATION METHOD AND PROGRAM

(75) Inventor: Ryo Sawai, Tokyo (JP)

(73) Assignee: Sony Corporation, Tokyo (JP)

(*) Notice: Subject to any disclaimer, the term of this patent is extended or adjusted under 35 U.S.C. 154(b) by 380 days.

(21) Appl. No.: 12/556,971

(22) Filed: Sep. 10, 2009

(65) Prior Publication Data

US 2011/0105142 A1 May 5, 2011

(30) Foreign Application Priority Data

Oct. 10, 2008 (JP) ................................. 2008-264565

(51) Int. Cl.
*H04W 24/00* (2009.01)

(52) U.S. Cl. ............... 455/456.1; 455/456.6; 455/422.1

(58) Field of Classification Search .................. None
See application file for complete search history.

(56) References Cited

U.S. PATENT DOCUMENTS

| | | | |
|---|---|---|---|
| 2004/0162059 A1* | 8/2004 | Hiltunen et al. ............ | 455/412.1 |
| 2004/0203875 A1 | 10/2004 | Korneluk et al. | |
| 2005/0096013 A1* | 5/2005 | Lehikoinen et al. .......... | 455/411 |
| 2005/0197118 A1* | 9/2005 | Mitchell ........................ | 455/434 |
| 2007/0161383 A1* | 7/2007 | Caci .............................. | 455/457 |
| 2008/0032705 A1* | 2/2008 | Patel et al. .................. | 455/456.1 |
| 2008/0252527 A1* | 10/2008 | Garcia .......................... | 342/450 |
| 2010/0004005 A1* | 1/2010 | Pereira et al. ................ | 455/457 |
| 2011/0059756 A1* | 3/2011 | Moeglein et al. ........... | 455/456.5 |

FOREIGN PATENT DOCUMENTS

| | | |
|---|---|---|
| JP | 7-38948 | 2/1995 |
| JP | 7-271824 | 10/1995 |
| JP | 2002-152798 | 5/2002 |
| JP | 2006-501478 | 1/2006 |

OTHER PUBLICATIONS

U.S. Appl. No. 12/477,573, filed Jun. 3, 2009, Sawai, et al.
Office Action issued Aug. 17, 2010 in JP Application No. 2008-264565.

* cited by examiner

*Primary Examiner* — Ajit Patel
(74) *Attorney, Agent, or Firm* — Oblon, Spivak, McClelland, Maier & Neustadt, L.L.P.

(57) ABSTRACT

A wireless communication device is provided which includes a transmission section for discretely increasing transmission power and transmitting wireless signals, and an estimation section for estimating that, when a response signal to a previous wireless signal is not received from a first wireless communication device but a response signal to a current wireless signal is received therefrom, the first wireless communication device exists in a hollow circular first area, which is a difference between a reachable area of the previous wireless signal and a reachable area of the current wireless signal, having the self device at a center.

9 Claims, 10 Drawing Sheets

WIRELESS COMMUNICATION DEVICE, WIRELESS COMMUNICATION METHOD AND PROGRAM

BACKGROUND OF THE INVENTION

1. Field of the Invention

The present invention relates to a wireless communication device, a wireless communication method, and a program.

2. Description of the Related Art

In recent years, technologies relating to location estimation for a wireless communication device are widely spread. For example, a method is known where a wireless communication device estimates the location of itself based on triangulation by using reception strength of a beacon regularly transmitted from a base station and location information of the base station included in the beacon. According to this method, the wireless communication device has to receive beacons from at least three base stations.

SUMMARY OF THE INVENTION

However, according to a location estimation method in related art, a base station has to have location information of itself, and the base station has to transmit a beacon including the location information.

In light of the foregoing, it is desirable to provide a novel and improved wireless communication device, wireless communication method and program that are capable of performing location estimation by using a wireless signal not including the location information.

According to an embodiment of the present invention, there is provided a wireless communication device which includes a transmission section for discretely increasing transmission power and transmitting wireless signals, and an estimation section for estimating that, when a response signal to a previous wireless signal is not received from a first wireless communication device but a response signal to a current wireless signal is received therefrom, the first wireless communication device exists in a hollow circular first area, which is a difference between a reachable area of the current wireless signal and a reachable area of the previous wireless signal, having the self device at a centre.

The transmission section may transmit, in relation to each other, area information indicating the first area estimated by the estimation section and identification information indicating the first wireless communication device.

In addition to the area information estimated by the estimation section and the identification information, the transmission section may transmit, in relation to another wireless communication device, area information and identification information already received from the other wireless communication device.

When second area information related with the identification information of the first wireless communication device is received from a second wireless communication section and third area information is received from a third wireless communication device, the estimation section may estimate that, in case a hollow circular third area indicated by the third area information, a hollow circular second area indicated by the second area information and the first area are arranged so as to overlap with each other, a corresponding wireless communication device exists at the centre of each area.

In case absolute location information of at least two devices among the self device, the second wireless communication device and the third wireless communication device is known, the estimation section may estimate an absolute existing location of a wireless communication device other than the at least two devices based on the absolute location information of the at least two devices.

In case absolute location information of the first wireless communication device is known, the estimation section may estimate absolute existing locations of the self device, the second wireless communication device and the third wireless communication device by matching a map showing surroundings of a location indicated by the location information to an estimated location relationship among the self device, the second wireless communication device and the third wireless communication device.

The estimation section may estimate the first area by substituting a frequency of the response signal into an equation relating a frequency and a distance decay.

According to another embodiment of the present invention, there is provided a wireless communication method which includes the steps of discretely increasing transmission power and transmitting wireless signals, and estimating that, when a response signal to a previous wireless signal is not received from a first wireless communication device but a response signal to a current wireless signal is received therefrom, the first wireless communication device exists in a hollow circular first area, which is a difference between a reachable area of the current wireless signal and a reachable area of the previous wireless signal, having the self device at a centre.

According to another embodiment of the present invention, there is provided a program for causing a computer to function as a transmission section for discretely increasing transmission power and transmitting wireless signals, and an estimation section for estimating that, when a response signal to a previous wireless signal is not received from a first wireless communication device but a response signal to a current wireless signal is received therefrom, the first wireless communication device exists in a hollow circular first area, which is a difference between a reachable area of the current wireless signal and a reachable area of the previous wireless signal, having the self device at a centre.

According to the embodiments of the present invention described above, location estimation can be performed by using a wireless signal not including location information.

DETAILED DESCRIPTION OF THE INVENTION

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Furthermore, the "DETAILED DESCRIPTION OF THE INVENTION" will be described in the order shown below.

1. Configuration of Wireless Communication System 1 of Present Embodiment
2. Basic Function of Wireless Communication Device
3. Application Example
4. Conclusion and Supplement

1. OVERALL CONFIGURATION OF PRESENT EMBODIMENT

First, with reference to FIG. 1, a configuration of a wireless communication system 1 according to the present embodiment will be described.

Figure 1:
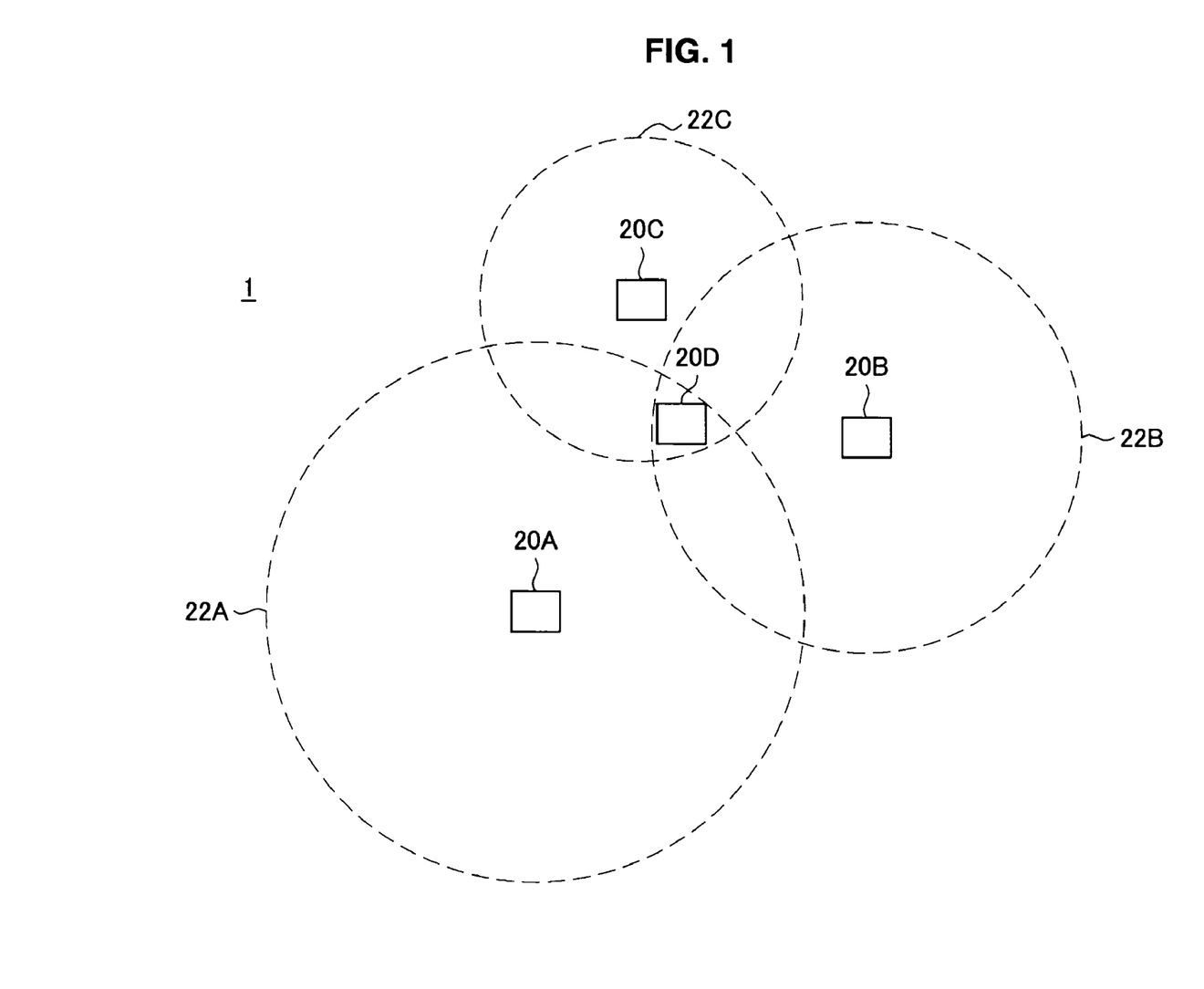
FIG. 1 is an explanatory diagram showing a configuration of a wireless communication system according to an embodiment.

FIG. 1 is an explanatory diagram showing the configuration of the wireless communication system 1 according to the present embodiment. As shown in FIG. 1, the wireless communication system 1 according to the present embodiment includes a plurality of wireless communication devices 20A to 20D. Furthermore, in FIG. 1, the wireless communication device 20D exists in an overlapping area of a radio wave reachable area 22A of the wireless communication device 20A, a radio wave reachable area 22B of the wireless communication device 20B and a radio wave reachable area 22C of the wireless communication device 20C.

Moreover, in this specification, each of a plurality of structural elements having a substantially same function will be distinguished from each other by adding a different alphabet letter to a same numeral. However, when there is no particular need to distinguish a plurality of structural elements having a same function from each other, only a same numeral will be added thereto. For example, when there is no particular need to distinguish the wireless communication devices 20A and 20B, they will be simply collectively referred to as the wireless communication devices 20.

Each wireless communication device 20 can perform wireless communication with a wireless communication device 20 existing within the radio wave reachable area 22. This wireless communication device 20 may be, for example, an information processing apparatus such as a personal computer (PC), a household image processing device (a DVD recorder, a video recorder or the like), a personal digital assistant (PDA), a home game machine, or an electrical household appliance. Furthermore, the wireless communication device 20 may be, for example, an information processing apparatus such as a mobile phone, a Personal Handyphone System (PHS), a portable music playback device, a portable image processing device, or a portable game machine. Furthermore, the wireless communication device 20 may be a base station of a wireless local area network (LAN) or the like.

Furthermore, the wireless communication device 20 performs wireless communication according to any communication protocol. Any communication protocol may be a communication protocol defined by Institute of Electrical and Electronic Engineers (IEEE) 802.11a, b, g, n, s or the like. Also, any communication protocol may be Worldwide Interoperability for Microwave Access (WiMAX) defined by IEEE 802.16 or a communication protocol defined by IEEE 802.22.

In the following, before describing the present embodiment, a location estimation method relating to the present embodiment will be described with reference to FIG. 2.

Figure 2:
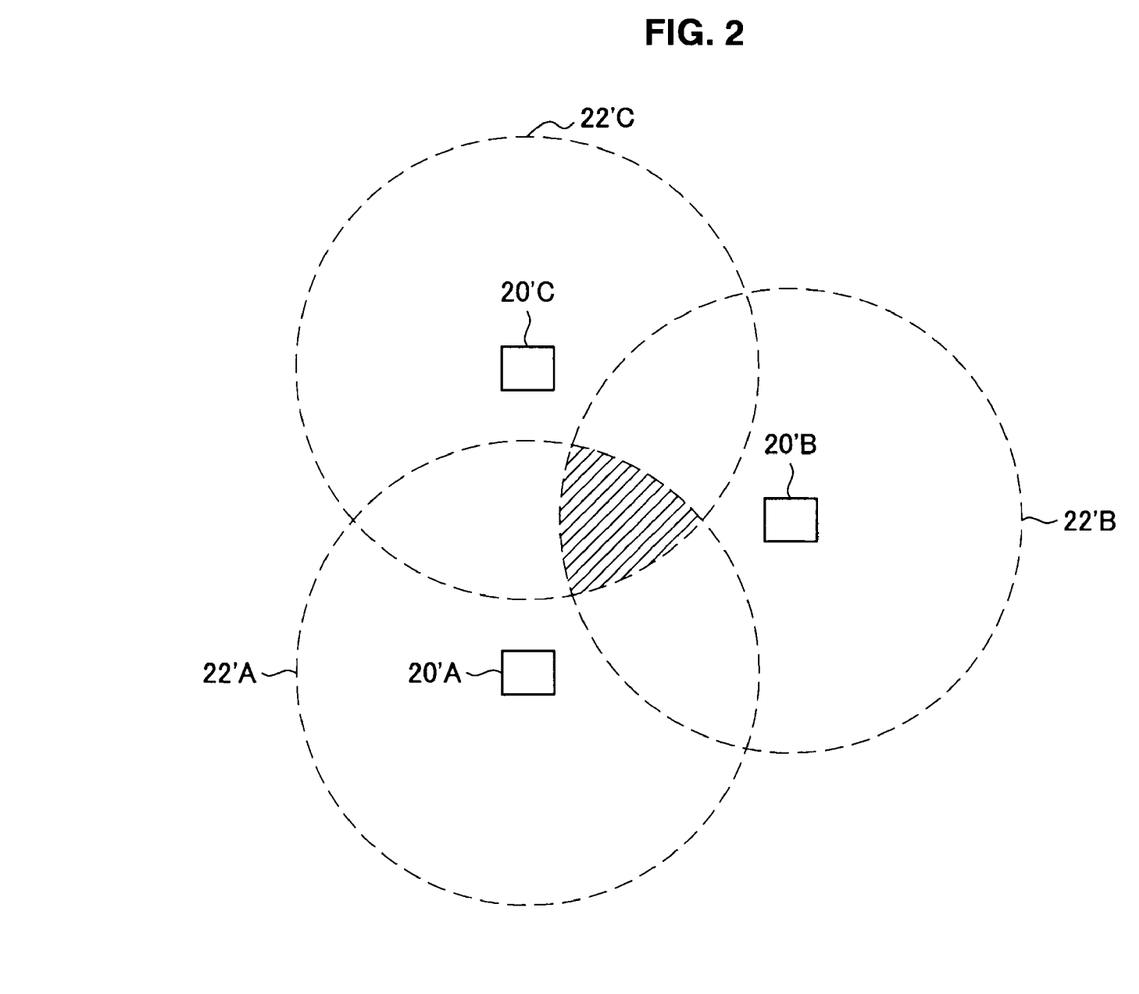
FIG. 2 is an explanatory diagram showing a configuration of a wireless communication system relating to the present embodiment.

FIG. 2 is an explanatory diagram showing a configuration of a wireless communication system relating to the present embodiment. As shown in FIG. 2, the wireless communication system relating to the present embodiment includes a plurality of wireless communication devices 20'A to 20'C. Furthermore, each wireless communication device 20' has location information of itself, and regularly transmits a beacon including the location information.

Furthermore, in FIG. 2, an overlapping area of a radio wave reachable area 22'A of the wireless communication device 20'A, a radio wave reachable area 22'B of the wireless communication device 20'B and a radio wave reachable area 22'C of the wireless communication device 20'C is shown with diagonals. The wireless communication device 20' existing in the overlapping area may receive beacons from the three wireless communication devices 20'A to 20'C, and may estimate the location of itself based on triangulation by using the location information included in the beacons and reception strength of the beacons.

However, with the location estimation method relating to the present embodiment, the wireless communication device 20' has to have the location information of itself, and also, has to transmit a beacon including the location information of the self device.

Thus, the wireless communication device 20 according to the present embodiment has been devised in light of the foregoing circumstances. The wireless communication device 20 according to the present embodiment may estimate location relationship to peripheral wireless communication device by discretely increasing transmission power and transmitting beacons (wireless signals). In the following, the wireless communication device 20 will be described in detail with reference to FIGS. 3 to 10.

2. BASIC FUNCTION OF WIRELESS COMMUNICATION DEVICE

Figure 3:
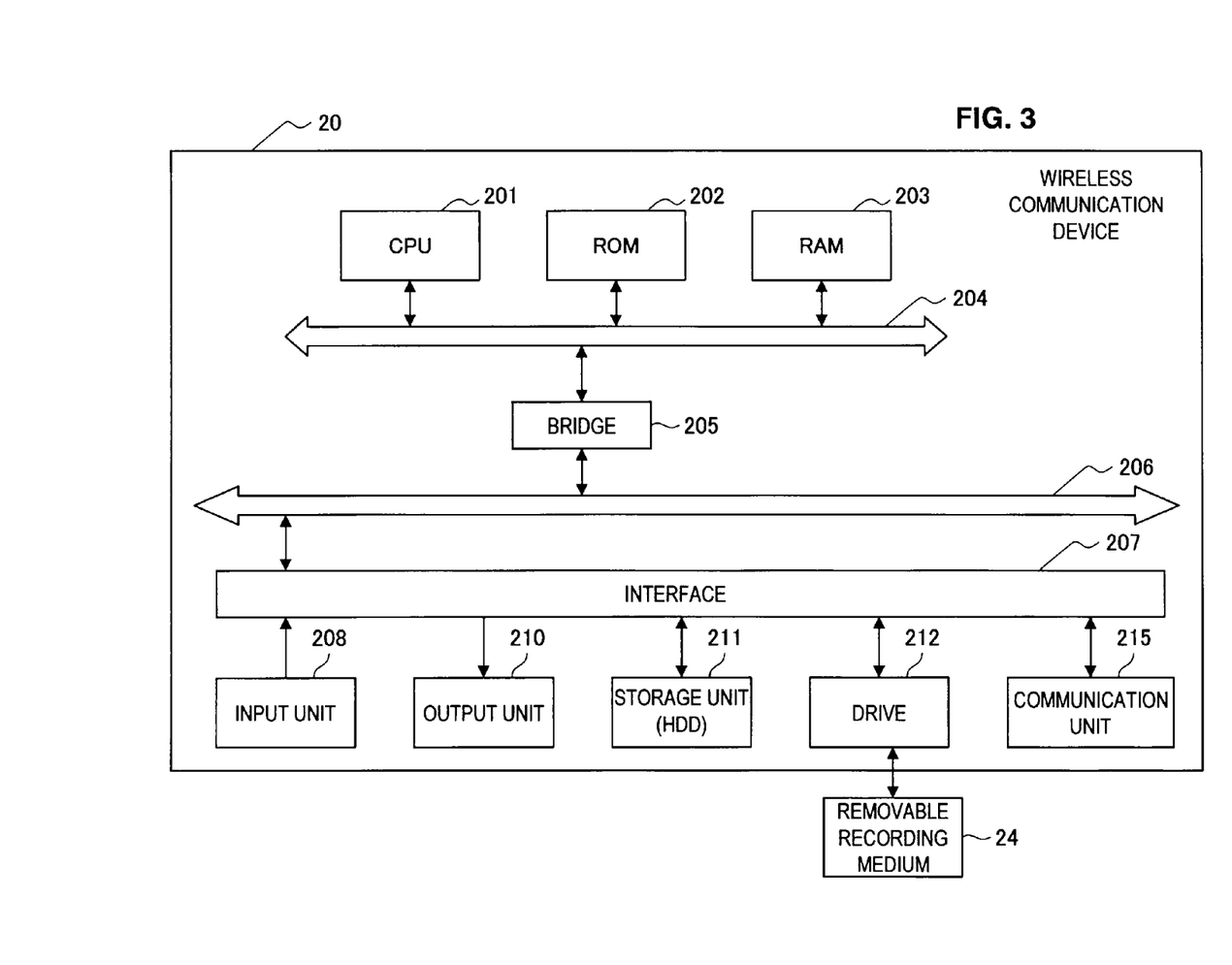
FIG. 3 is a block diagram showing a hardware configuration of a wireless communication device.

FIG. 3 is a block diagram showing a hardware configuration of the wireless communication device 20. The wireless communication device 20 includes a central processing unit (CPU) 201, a read only memory (ROM) 202, a random access memory (RAM) 203, and a host bus 204. Furthermore, the wireless communication device 20 includes a bridge 205, an external bus 206, an interface 207, an input unit 208, an output unit 210, a storage unit (HDD) 211, a drive 212, and a communication unit 215.

The CPU 201 functions as an arithmetic operation processing section and a control section, and controls the entire operations of the wireless communication device 20 according to various programs. Furthermore, the CPU 201 may be a microprocessor. The ROM 202 stores programs, arithmetic operation parameters or the like to be used by the CPU 201. The RAM 203 temporarily stores a program to be used by the CPU 201 in its execution, parameters that change appropriately in the execution, or the like. These are interconnected through the host bus 204 configured from a CPU bus or the like.

The host bus 204 is connected to the external bus 206 such as a peripheral component interconnect/interface (PCI) bus through the bridge 205. Moreover, the host bus 204, the bridge 205 and the external bus 206 do not necessarily have to be configured separately, and the functions may be implemented in a single bus.

The input unit 208 is configured from an operation section to be operated by a user, such as a mouse, a keyboard, a touch panel, a button, a microphone, a switch or a lever, an input control circuit for generating an input signal based on an input by the user and for outputting the input signal to the CPU 201, and the like. The user of the wireless communication device 20 can input various types of data to the wireless communication device 20 or issue an instruction for a processing operation by operating this input unit 208.

The output unit 210 includes, for example, a display device such as a cathode ray tube (CRT) display device, a liquid crystal display (LCD) device, an organic light emitting diode (OLED) device, or a lamp. Furthermore, the output unit 210 includes an audio output device such as a speaker, a head phone, or the like. The output unit 210 outputs reproduced content, for example. Specifically, the display device displays various types of information of reproduced image data or the like in the form of text or image. On the other hand, the audio output device converts reproduced audio data or the like to sound and outputs the sound.

The storage unit 211 is a data storage device configured as an example of the storage section of the wireless communication device 20 according to the present embodiment. The storage unit 211 may include a storage medium, a recording unit for recording data on the storage medium, a read unit for reading data out of the storage medium, a deletion unit for deleting data recorded on the storage medium, or the like. The storage unit 211 drives a hard disk, and stores programs to be executed by the CPU 201 and various types of data.

The drive 212 is a reader/writer for the storage medium, and is built in or externally attached to the wireless communication device 20. The drive 212 reads out information stored in an attached removable recording medium 24 such as a magnetic disk, an optical disk, a magneto-optical disk, a semiconductor memory or the like and outputs the information to the RAM 203.

The communication unit 215 is, for example, a communication interface configured from a communication device or the like for wirelessly communicating with another wireless communication device 20. The communication unit 215 transmits/receives a beacon or a response signal to the beacon to/from another wireless communication device 20.

Figure 4:
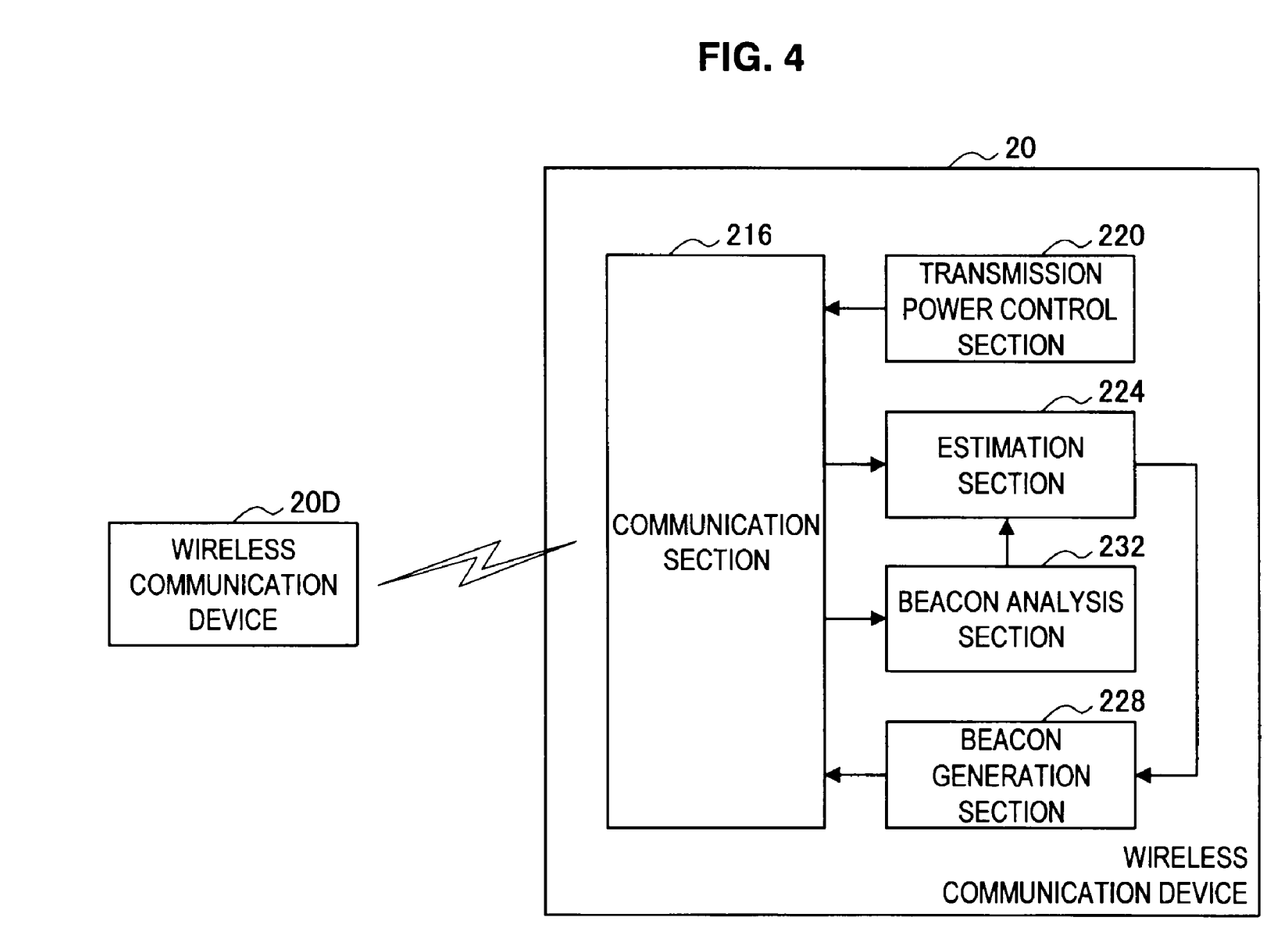
FIG. 4 is a functional block diagram showing a configuration of the wireless communication device according to the present embodiment.

FIG. 4 is a functional block diagram showing a configuration of the wireless communication device 20 according to the present embodiment. As shown in FIG. 4, the wireless communication device 20 according to the present embodiment includes a communication section 216, a transmission power control section 220, an estimation section 224, a beacon generation section 228, and a beacon analysis section 232.

The communication section 216 is an interface to the other wireless communication device 20D (the wireless communication device 20D is shown in FIG. 4 only as an example). For example, the communication section 216 has a function of a transmission section for transmitting a wireless signal such as the beacon, and a function of a reception section for receiving a response signal to the beacon.

The transmission power control section 220 controls transmission power of the communication section 216 for a beacon. In the following, an example of control of the transmission power by the transmission power control section 220 will be described with reference to FIG. 5.

Figure 5:
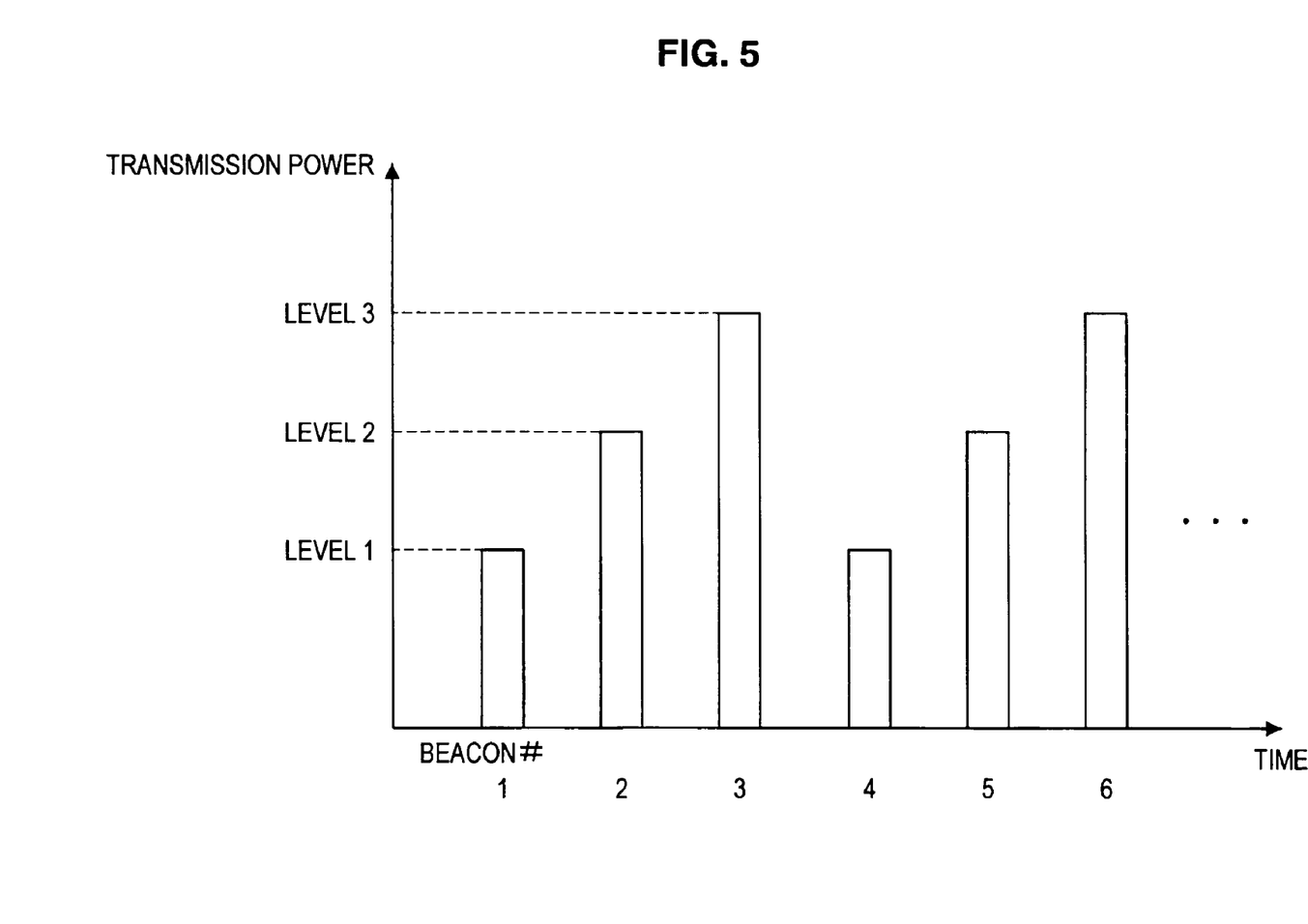
FIG. 5 is an explanatory diagram showing an example of control of transmission power by a transmission power control section.

FIG. 5 is an explanatory diagram showing an example of control of the transmission power by the transmission power control section 220. As shown in FIG. 5, the transmission power control section 220 increases the transmission power for a beacon every time a beacon is transmitted. Then, when the transmission power becomes maximum, the transmission power control section 220 sets the transmission power to minimum.

More specifically, in the example shown in FIG. 5, beacons will be transmitted with the transmission power in the order of level 1, level 2, level 3, level 1, . . . .

The estimation section 224 estimates the existing location of a device which transmitted a response signal, based on the response signal (for example, an ACK) to a beacon transmitted from the communication section 216. For example, when a response signal to a previous beacon is not received from the wireless communication device 20D but a response signal to a current beacon is received therefrom, the estimation section 224 estimates that the wireless communication device 20D exists in the hollow circular area, which is the difference between the reachable area of the current beacon and the reachable area of the previous beacon, having the self device at the centre. In the following, a more detailed explanation will be made with reference to FIG. 6.

Figure 6:
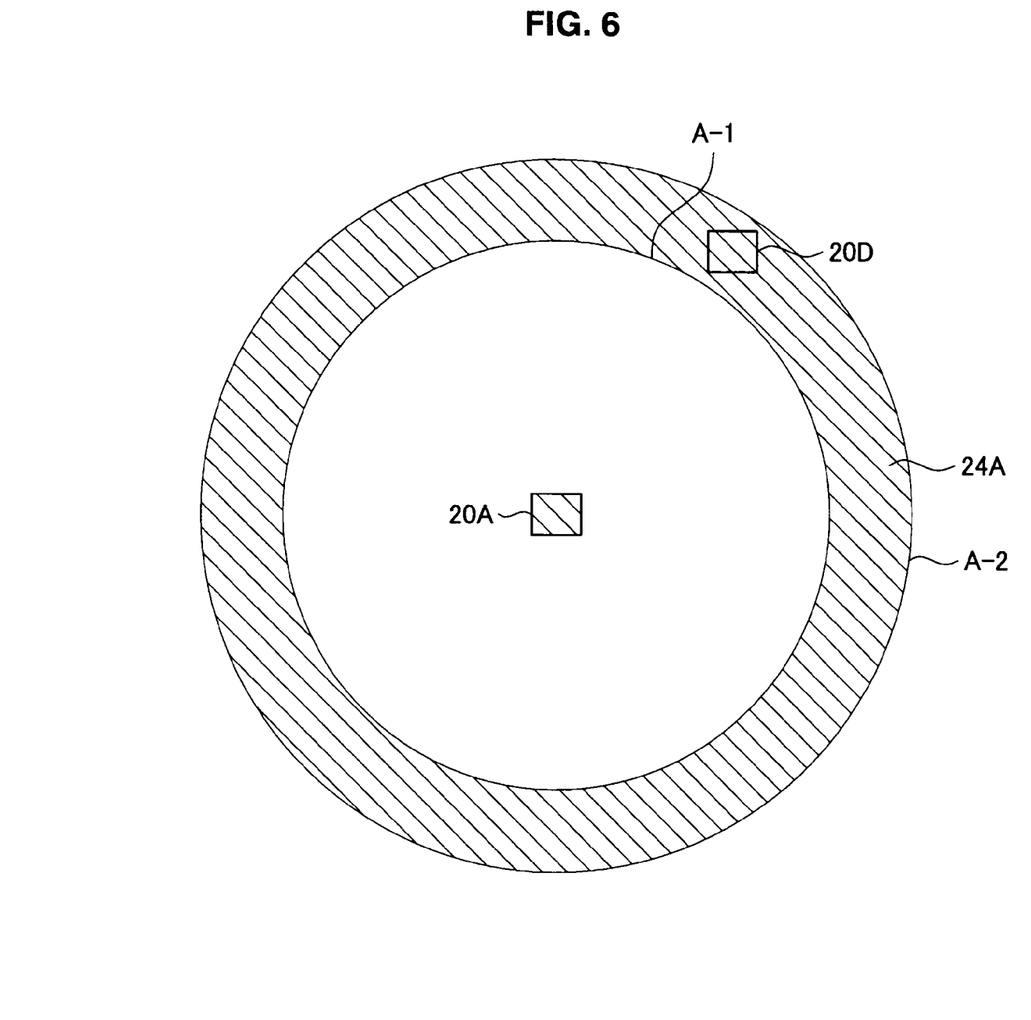
FIG. 6 is an explanatory diagram showing a location relationship among a plurality of wireless communication devices.

FIG. 6 is an explanatory diagram showing a location relationship between the wireless communication device 20A and the wireless communication device 20D. Furthermore, in FIG. 6, a reachable area A-1 of a beacon at transmission power level 1 and a reachable area A-2 at transmission power level 2 are respectively shown as a circle.

Here, since the wireless communication device 20D is not able to receive a beacon transmitted at transmission power level 1, it does not transmit a response signal to the beacon transmitted at transmission power level 1. Therefore, the wireless communication device 20A is not able to receive a response signal from the wireless communication device 20D to the beacon transmitted at transmission power level 1.

On the other hand, when transmission power for a beacon becomes level 2, since the wireless communication device 20D can receive the beacon, it transmits a response signal to the beacon. Therefore, the wireless communication device 20A can receive a response signal from the wireless communication device 20D to the beacon transmitted at transmission power level 2.

Accordingly, the estimation section 224 can estimate that the wireless communication device 20D exists in a hollow circular area 24A which is on the outside of the reachable area A-1 of a beacon at transmission power level 1 and on the inside of the reachable area A-2 of a beacon at transmission power level 2. Moreover, the area 24A corresponds to the difference between the reachable area A-1 of a beacon at transmission power level 1 and the reachable area A-2 of a beacon at transmission power level 2.

Moreover, the reachable area A-1, A-2 or the like of a beacon may be an area where reception strength of a beacon is assumed to exceed a predetermined value. The area may be specified by an equation relating a frequency and a distance decay shown below.

(Reference) Kyoritsu Publishing, Personal Intelligence, Takeshi Hattori et al.

Urban District $$L_p = 65.25 + 26.16 \log_{10} f_c - 13.82 \log_{10} h_b - a(h_m)^* + (44.9 - 6.55 \log_{10} h_b) \log_{10} \gamma [dB]$$

Suburbs $$L_{ps}=L_p-2\{\log_{10}(f/28)\}^2-5.4 \text{ [dB]}$$

Open Space $$L_{po}=L_p-4.78\{\log_{10}(f/28)\}^2-18.33 \log_{10}f_c-40.94 \text{ [dB]} \quad \text{(Equation 1)}$$

$f_c$=frequency
$h_b$=transmission source effective antenna height (m)
$h_m$=receiver side antenna height (m)
γ=distance (km)
mid-sized city: $a(h_m)=(1.1 \log_{10} f_c-0.7)h_m-(1.56 \log_{10} f_c-0.8)$
large city: $a(h_m)=8.29(\log_{10}1.54 h_m)^2-1.1$:$f_c \leq 200$ MHz The beacon generation section 228 generates a beacon including area information indicating the area 24A estimated by the estimation section 224 and identification information of the wireless communication device 20D, and the communication section 216 transmits the beacon.

Moreover, the area information may include information indicating the outer radius and the inner radius of the hollow circular area 24A, or information indicating the centre, the radius and the area width. Furthermore, the area information may include information indicating transmission power with which a response signal was not received and transmission power with which a response signal was received. Furthermore, the identification information may be a device ID or a network address, for example.

Furthermore, the area information estimated by the estimation section 224 may be stored in a storage medium, such as a non-volatile memory, a magnetic disk, an optical disk, a magneto optical (MO) disk, or the like. The non-volatile memory may be, for example, an electrically erasable programmable read-only memory (EEPROM) or an erasable programmable ROM (EPROM). Furthermore, the magnetic disk may be a hard disk, a discoid magnetic disk, or the like. Furthermore, the optical disk may be a compact disc (CD), a digital versatile disc recordable (DVD-R), a Blu-Ray (BD (registered trademark)) disc, or the like.

Subsequently, with reference to FIG. 7, a flow of an operation of the wireless communication device 20 according to the present embodiment will be described.

Figure 7:
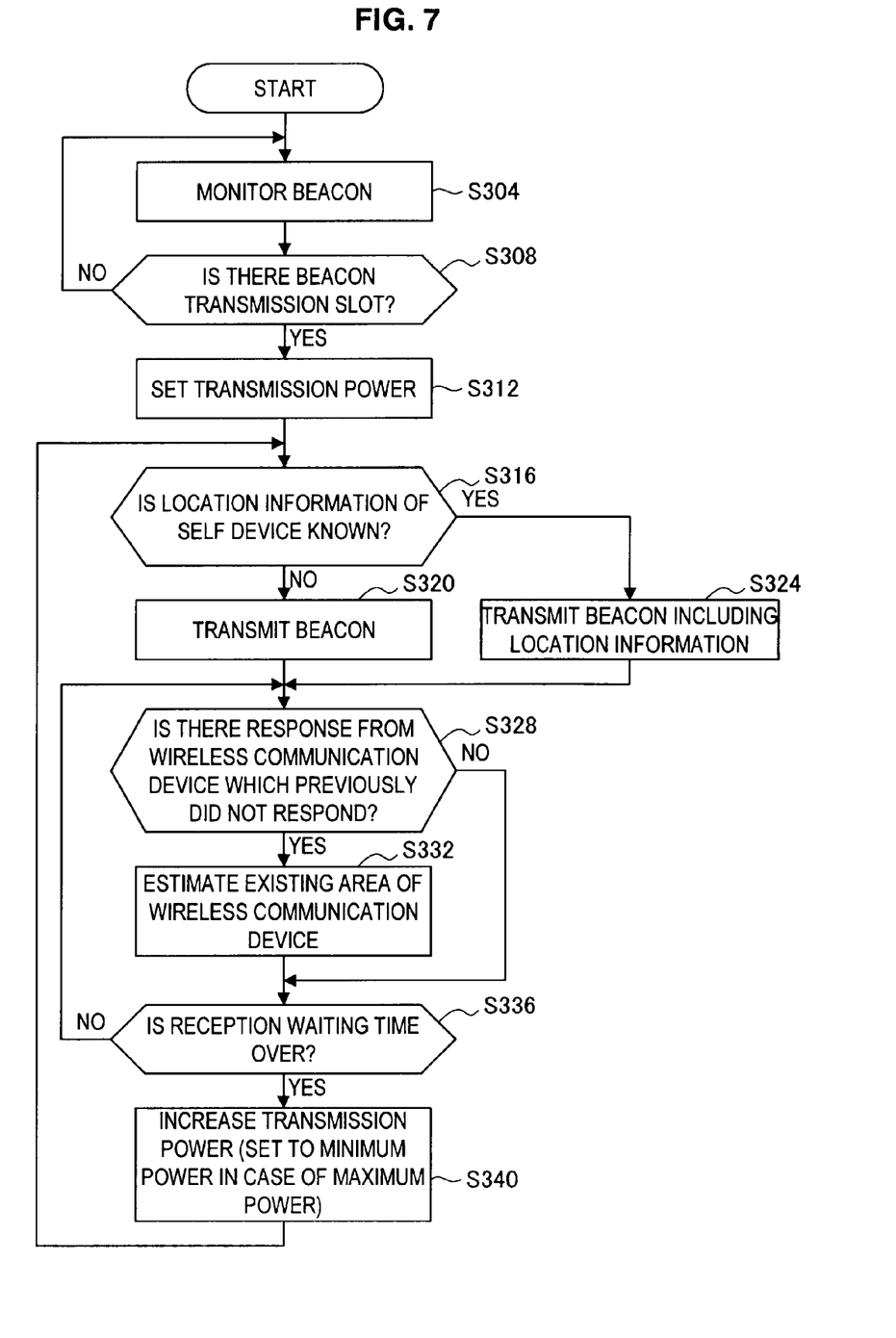
FIG. 7 is a flow chart showing a flow of an operation of the wireless communication device according to the present embodiment.

FIG. 7 is a flow chart showing a flow of an operation of the wireless communication device 20 according to the present embodiment. First, as shown in FIG. 7, the communication section 216 of the wireless communication device 20 monitors beacons being transmitted in the periphery by performing a reception operation for over a predetermined period of time (S304).

Then, when there is a beacon transmission slot that the self device can use (S308), the transmission power control section 220 sets the transmission power for a beacon to, for example, a minimum power (S312).

Subsequently, when the location information of the self device is known (S316), the beacon generation section 228 generates a beacon including the location information of the self device, and the communication section 216 transmits the beacon (S324). On the other hand, when the location information of the self device is unknown (S316), the communication section 216 transmits a beacon not including the location information of the self device (S320).

Then, when a response signal is received from a wireless communication device 20 from which a response signal to a previous beacon (for which the transmission power was lower than for the present beacon) was not received, the estimation section 224 estimates the area where the wireless communication device 20 exists, based on the transmission power for the beacons (S328, S332).

When a reception waiting time for a response signal is over (S336), the transmission power control section 220 increases the transmission power for a beacon (S340). When the transmission power is already at the maximum, the transmission power control section 220 may set the transmission power to minimum.

As described above, the wireless communication device 20 according to the present embodiment can estimate the area where other wireless communication device 20 exists by discretely increasing the transmission power for a beacon. In the following, an application example of the function will be described with reference to FIGS. 8 to 10.

3. APPLICATION EXAMPLE

The beacon generation section 228 of each wireless communication device 20 generates a beacon including, in addition to a list (identification information and area information) of peripheral devices of the self device obtained in the estimation by the estimation section 224, a list already received from other wireless communication device 20. Specifically, each wireless communication device 20 merges the list of peripheral devices of other wireless communication device 20 with the list of peripheral devices of the self device, and transmits the same. Moreover, each list includes information indicating whose list the list is, among the lists of peripheral devices of the wireless communication devices 20.

When receiving a list of peripheral devices of other wireless communication device 20, the wireless communication device 20 extracts identification information included in the list as well as in the list of peripheral devices of itself, and estimates the location of the wireless communication device 20 having the extracted identification information.

For example, a case is considered where the beacon analysis section 232 of the wireless communication device 20A grasps, in the state shown in FIG. 6, that identification information of the wireless communication device 20D is included in the list of peripheral devices of the wireless communication device 20B as well as in the list of the self device.

Figure 8:
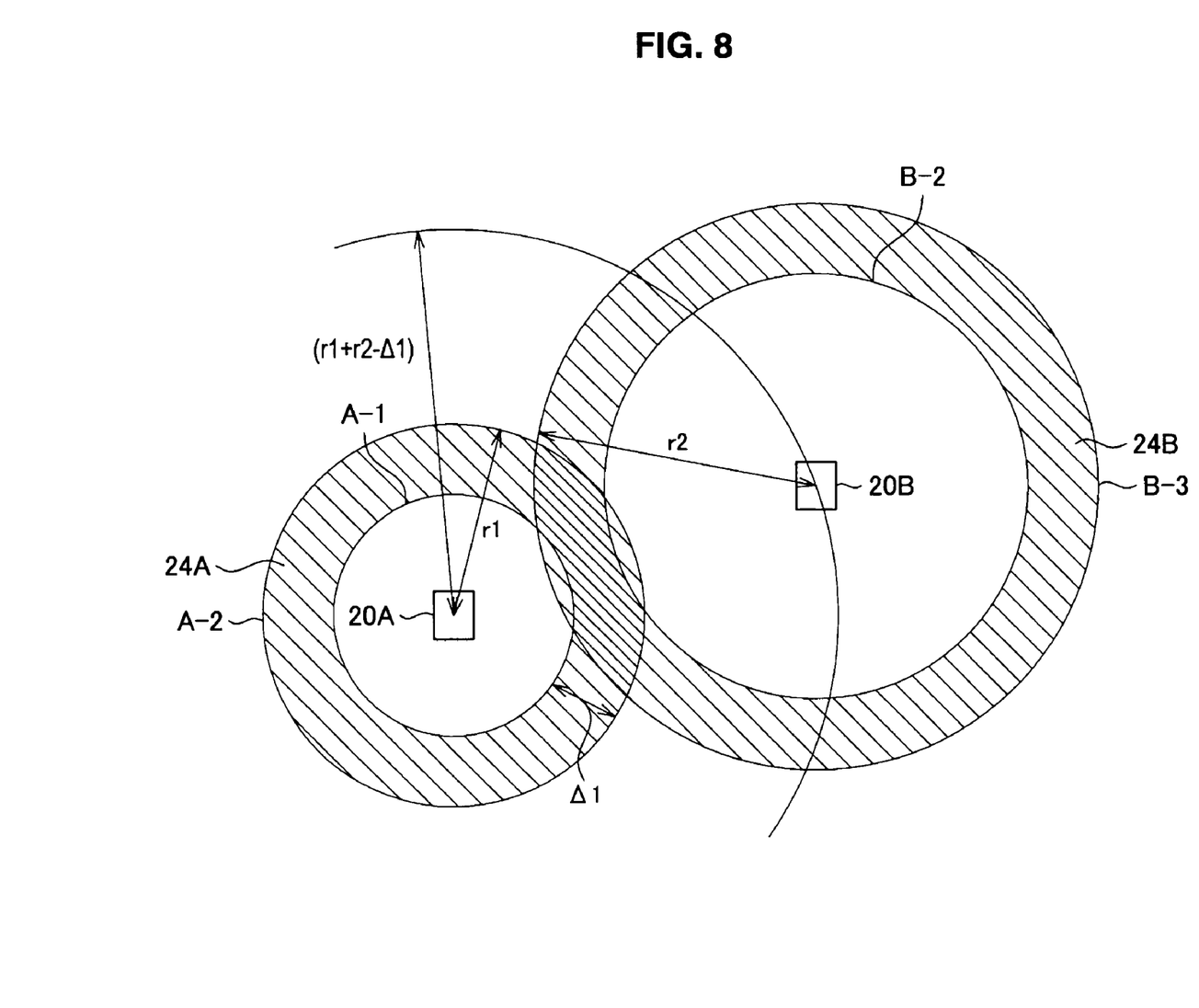
FIG. 8 is an explanatory diagram showing a location relationship among a plurality of wireless communication devices estimated by an estimation section.

FIG. 8 is an explanatory diagram showing a location relationship among a plurality of wireless communication devices 20 estimated by the estimation section 224. As shown in FIG. 8, since the wireless communication device 20B is outside the communication area of the wireless communication device 20A, the estimation section 224 of the wireless communication device 20A overlaps the area 24A that the estimation section 224 estimated and area 24B indicated by the area information of the wireless communication device 20D acquired from the wireless communication device 20B.

Here, when assuming that the outer radius of the area 24A is r1, the width of the area 24A is Δ1 and the outer radius of the area 24B is r2, the estimation section 224 estimates that the wireless communication device 20B exists near the circumference of the radius (r1+r2−Δ1) with the wireless communication device 20A as the centre.

Furthermore, a case is considered where the beacon analysis section 232 of the wireless communication device 20A grasps that a beacon including the area information of the wireless communication device 20D is transmitted also from the wireless communication device 20C.

Figure 9:
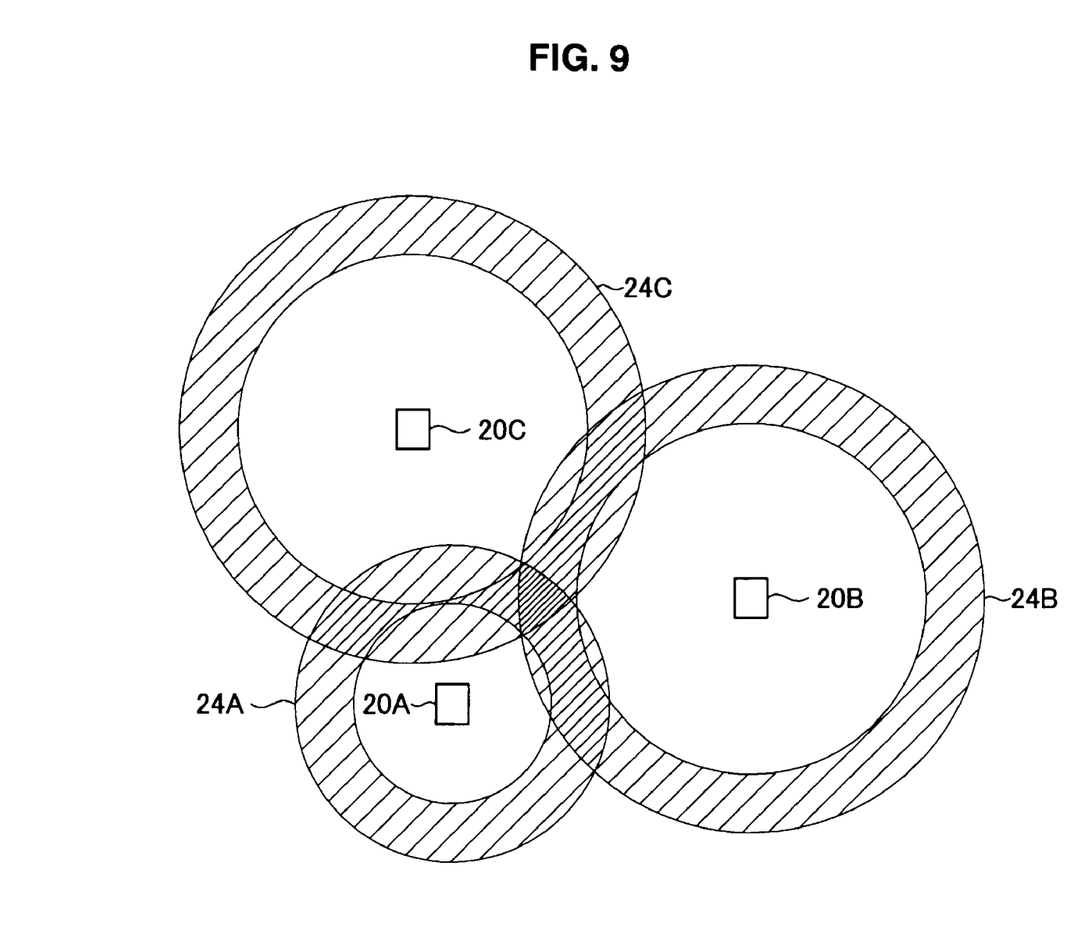
FIG. 9 is an explanatory diagram showing a location relationship among a plurality of wireless communication devices estimated by the estimation section.

In this case, based on the area information acquired from the wireless communication device 20C, the area information acquired from the wireless communication device 20B and the area information that the wireless communication device 20A estimated, the wireless communication device 20A estimates the location relationship among the wireless communication devices 20A to 20C to be that shown in FIG. 9.

FIG. 9 is an explanatory diagram showing a location relationship among a plurality of wireless communication devices 20 estimated by the estimation section 224. As shown in FIG. 9, in case a hollow circular area 24C indicated by the area information acquired from the wireless communication device 20C, the area 24B and the area 24A are arranged in an overlapping manner, the estimation section 224 estimates that the wireless communication devices 20A to 20C respectively exist in the centre of the areas 24A to 24C.

Furthermore, the estimation section 224 estimates that the wireless communication device 20D exists in the overlapped area of the area 24C, the area 24B and the area 24A.

In this manner, a relative location relationship of a plurality of wireless communication devices 20 can be estimated by using the area information transmitted from the plurality of wireless communication devices 20. Furthermore, estimation accuracy can be improved by using area information transmitted from large number of wireless communication devices 20.

Furthermore, in case the wireless communication device 20 can grasp, by itself, the location information using a GPS function or the like, each wireless communication device 20 may, at the time of transmitting a beacon, describe the location information of itself in the beacon, and transmit the same to other terminal. The location information obtained by the GPS or the like may be used as reference location information. Furthermore, the list of peripheral devices is configured in a predetermined format, and is described the location relationship with the peripheral devices having each wireless communication device 20 as a reference.

As described, if a certain wireless communication device 20 transmits a beacon including the location information or azimuth, absolute locations of a plurality of wireless communication devices 20 can be estimated with reference to the location information of the certain wireless communication included in the beacon, for example.

Furthermore, when location information of a wireless communication device is known, absolute locations of a plurality of wireless communication devices 20 can be estimated by using map information. In the following, explanation will be made with reference to FIG. 10.

Figure 10:
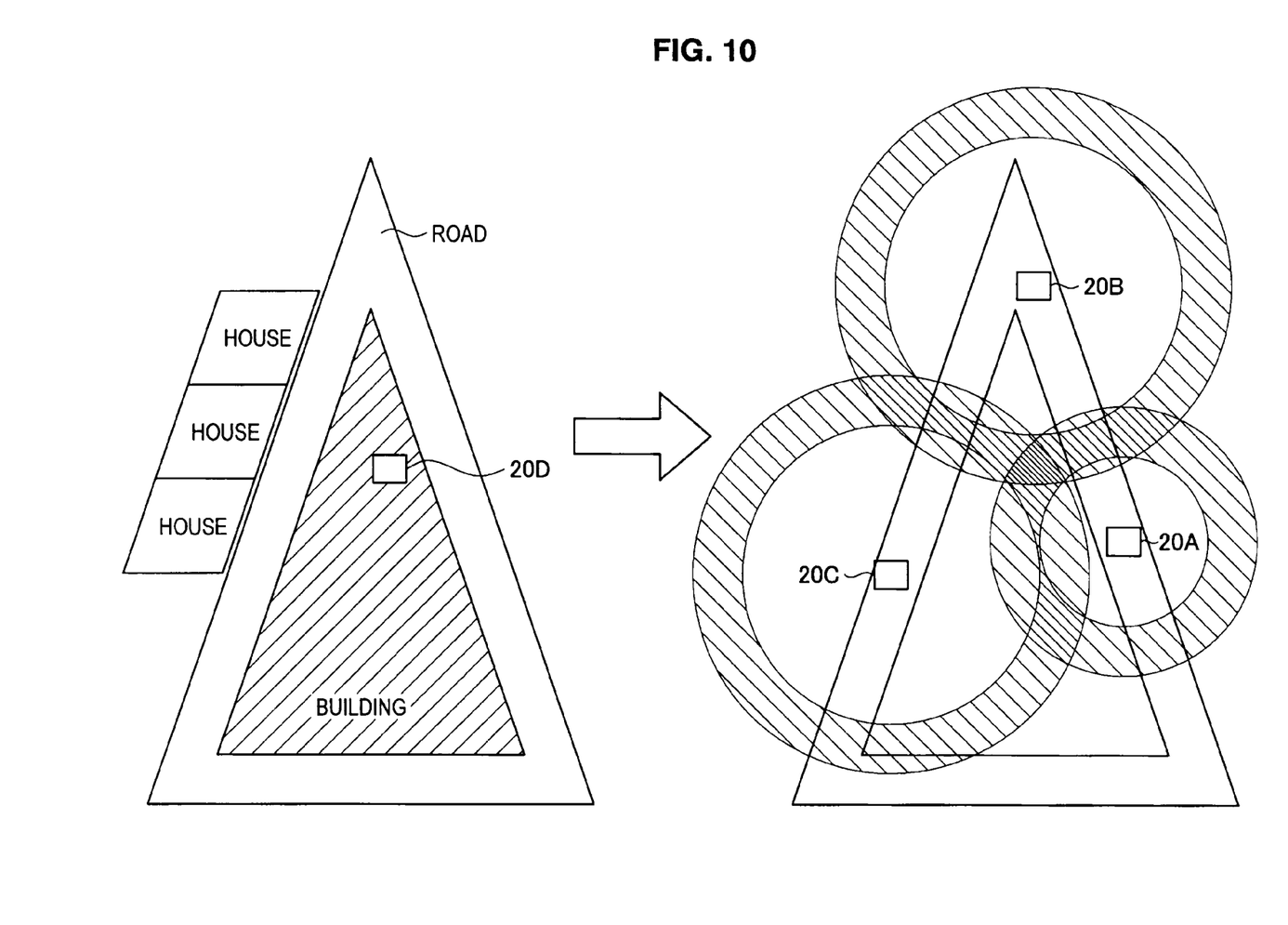
FIG. 10 is an explanatory diagram showing an example of using map information.

FIG. 10 is an explanatory diagram showing an example of using the map information. More specifically, the left-hand side drawing of FIG. 10 shows a map developed based on the map information. A triangular building, a plurality of houses, and a road around the triangular building are shown on the map.

Here, it is assumed that the wireless communication device 20D exists in the triangular building, and that the wireless communication device 20D has the location information of the self device and is transmitting the location information. Furthermore, it is estimated that the wireless communication devices 20A to 20C are in the location relationship shown in FIG. 9.

In this case, based on the assumption that users carrying the wireless communication devices 20A to 20C are on the road, the estimation section 224 of the wireless communication device 20A performs a matching between the map information and the location relationship among the wireless communication devices 20A to 20C according to which the wireless communication devices 20A to 20C are located on the road.

As a result, as shown in the right-hand side drawing of FIG. 10, when the wireless communication devices 20A to 20C are located on the road while maintaining the estimated location relationship, the estimation section 224 can estimate the absolute locations of the wireless communication devices 20A to 20C.

4. CONCLUSION AND SUPPLEMENT

As described above, the wireless communication device 20 according to the present embodiment can estimate the area where other wireless communication device 20 exists by discretely increasing the transmission power for beacons.

Furthermore, the wireless communication device 20 can estimate the reachable area of a beacon transmitted at certain transmission power, based on a relation equation taking transmission frequency of a beacon into consideration. Accordingly, even when the wireless communication device 20 flexibly changes the frequency to be used, the accuracy can be maintained.

Furthermore, the wireless communication device 20 according to the present embodiment can estimate the relative location relationship (network topology) of respective wireless communication devices 20 based on the area information of a certain wireless communication device 20 transmitted from one or more other wireless communication devices 20. The location relationship can be used for routing, selection of a communication protocol to be used, or the like.

Furthermore, the wireless communication device 20 according to the present embodiment can estimate the absolute locations of the wireless communication devices 20 by using, in combination, the location relationship of respective wireless communication devices 20 and the map information. Furthermore, also when the location information of at least two wireless communication devices 20 is known, the wireless communication device 20 according to the present embodiment can estimate the absolute locations of the respective wireless communication devices 20.

It should be understood by those skilled in the art that various modifications, combinations, sub-combinations and alterations may occur depending on design requirements and other factors insofar as they are within the scope of the appended claims or the equivalents thereof.

For example, FIG. 5 only shows an example of control of the transmission power by the transmission power control section 220, and the present invention is not limited to such an example. As a modified example, the transmission power control section 220 may set a same transmission power for a plurality of beacons, such as level 1, level 1, level 2, level 2, level 3, level 3, level 1, level 1, . . . .

Furthermore, although an example is described with reference to FIG. 5 where the transmission power control section 220 switches the transmission power between three stages, the present invention is not limited to such an example. For example, the transmission power control section 220 may switch the transmission power between two stages, or larger number of stages such as four or more.

Furthermore, the transmission power control section 220 may set the maximum value of the transmission power according to the remaining power of the wireless communication device 20. For example, the transmission power control section 220 may set the maximum value of the transmission power to a smaller value as the remaining power of the wireless communication device 20 is less.

In a similar manner, the transmission power control section 220 may set the minimum value of the transmission power according to the remaining power of the wireless communication device 20. For example, the transmission power control section 220 may set the minimum vale of the transmission power to a larger value as the remaining power of the wireless communication device 20 is more.

For example, each of the steps performed by the wireless communication device 20 in this specification does not necessarily have to be performed chronologically in the order shown in the sequence diagram or the flow chart. For example, each of the steps in the processing by the wireless communication device 20 may include processing in parallel or as individual steps (for example, parallel processing or object processing).

Furthermore, a computer program may also be provided that directs hardware such as the CPU 201, the ROM 202, the RAM 203 and the like built into the wireless communication device 20 to fulfill functions corresponding to each of the structural elements of the wireless communication device 20 described above.

Furthermore, a storage medium on which the computer program is stored is also provided. Furthermore, a series of processes may be performed by hardware by configuring each of the functional blocks shown in the functional block diagram in FIG. 4 as hardware.

The present application contains subject matter related to that disclosed in Japanese Priority Patent Application JP 2008-264565 filed in the Japan Patent Office on 10 Oct. 2008, the entire content of which is hereby incorporated by reference.

What is claimed is:

1. A wireless communication device, comprising:
   a transmission section for discretely increasing transmission power and transmitting wireless signals; and
   an estimation section for estimating that, when a response signal to a previous wireless signal is not received from a first wireless communication device but a response signal to a current wireless signal is received from the first wireless communication device, the first wireless communication device exists in a hollow circular first area, which is a difference between a reachable area of the current wireless signal and a reachable area of the previous wireless signal, having the wireless communication device at a centre of a hollow part of the hollow circular first area.

2. The wireless communication device according to claim 1, wherein
   the transmission section transmits, in relation to each other, area information indicating the first area estimated by the estimation section and identification information indicating the first wireless communication device.

3. The wireless communication device according to claim 2, wherein
   in addition to the area information estimated by the estimation section and the identification information, the transmission section transmits, in relation to another wireless communication device, area information and identification information already received from the other wireless communication device.

4. The wireless communication device according to claim 3, wherein
   when second area information related with the identification information of the first wireless communication device is received from a second wireless communication device and third area information is received from a third wireless communication device, the estimation section estimates that, in case a hollow circular third area indicated by the third area information, a hollow circular second area indicated by the second area information and the first area are arranged so as to overlap with each other, a corresponding wireless communication device exists at a centre of each area.

5. The wireless communication device according to claim 4, wherein
   in case absolute location information of at least two devices among the self device, the second wireless communication device and the third wireless communication device is known, the estimation section estimates an absolute existing location of a wireless communication device other than the at least two devices based on the absolute location information of the at least two devices.

6. The wireless communication device according to claim 4, wherein
   in case absolute location information of the first wireless communication device is known, the estimation section estimates absolute existing locations of the self device, the second wireless communication device and the third wireless communication device by matching a map showing surroundings of a location indicated by the location information to an estimated location relationship among the self device, the second wireless communication device and the third wireless communication device.

7. The wireless communication device according to claim 6, wherein the estimation section estimates the first area by substituting a frequency of the response signal into an equation relating a frequency and a distance decay.

8. A wireless communication method, comprising the steps of:
   discretely increasing transmission power and transmitting wireless signals; and
   estimating that, when a response signal to a previous wireless signal is not received from a first wireless communication device but a response signal to a current wireless signal is received therefrom, the first wireless communication device exists in a hollow circular first area, which is a difference between a reachable area of the current wireless signal and a reachable area of the previous wireless signal, having a wireless communication device at a centre of a hollow part of the hollow circular first area.

9. A non-transitory computer-readable storage medium storing instructions thereon, which, when executed by a computer, cause the computer to function as:
   a transmission section for discretely increasing transmission power and transmitting wireless signals; and
   an estimation section for estimating that, when a response signal to a previous wireless signal is not received from a first wireless communication device but a response signal to a current wireless signal is received therefrom, the first wireless communication device exists in a hollow circular first area, which is a difference between a reachable area of the current wireless signal and a reachable area of the previous wireless signal, having a wireless communication device at a centre of a hollow part of the hollow circular first area.

* * * * *